July 19, 1938.  W. J. MORRILL ET AL  2,124,427
SPLIT PHASE MOTOR
Filed Nov. 13, 1936  3 Sheets-Sheet 1

Inventors:
Wayne J. Morrill,
Kenneth A. Killam,
by Harry E. Dunham
Their Attorney.

Inventors:
Wayne J. Morrill,
Kenneth A. Killam,
by Harry E. Dunham
Their Attorney.

Patented July 19, 1938

2,124,427

UNITED STATES PATENT OFFICE 2,124,427

SPLIT PHASE MOTOR

Wayne J. Morrill and Kenneth A. Killam, Fort Wayne, Ind., assignors to General Electric Company, a corporation of New York Application November 13, 1936, Serial No. 110,628

5 Claims. (Cl. 172—278)

Our invention relates to split phase motors of the type in which main and starting windings are employed and in which the starting winding is disconnected as the motor comes up to speed, and its primary object is to reduce the cost of such motors without sacrificing performance characteristics.

In carrying our invention into effect we employ what may be considered concentrated primary windings as distinguished from distributed windings, and use a main coil pitch and flux distribution which avoids the detrimental effects of harmonics which are invariably present when full pitch concentrated windings are used. A further object of our invention is to provide a stator structure which is economical both from the standpoint of the amount of material used and from the standpoint of permitting the main coils to be wound thereon by machinery.

Our invention is particularly suitable for use in motors of the fractional horsepower sizes where low cost quantity production is called for. Our motor has performance characteristics approaching those of the more expensive split phase motor which uses distributed windings, but its cost is more nearly comparable to the shaded pole motor which has less desirable performance characteristics.

Figure 1:
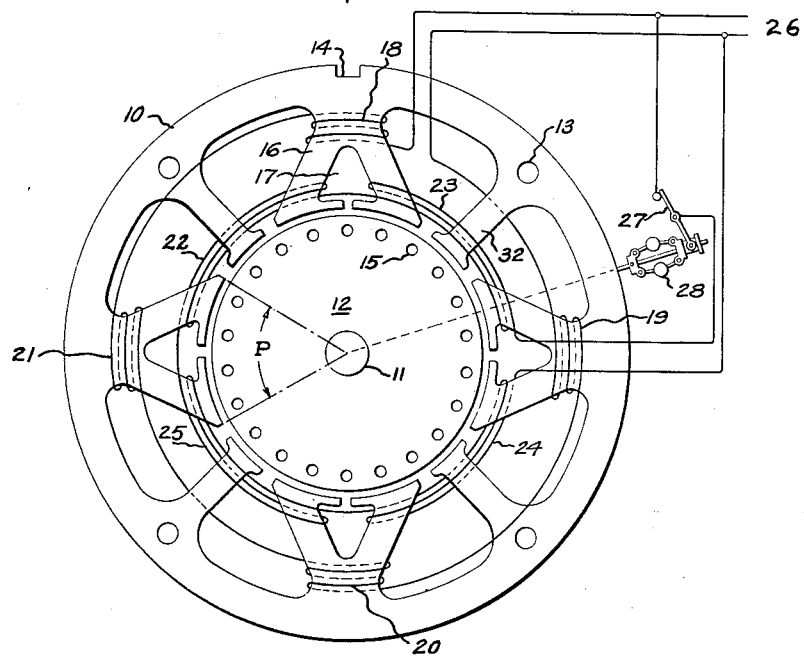

The features of our invention which are believed to be novel and patentable will be pointed out in the claims appended hereto. For a better understanding of our invention, reference is made in the following description to the accompanying drawings in which Fig. 1 shows a motor using a form of stator magnetic circuit which we have found to be particularly suitable for our purposes. Fig. 1 also indicates the main and starting windings thereon and their circuit connections.

Figure 2:
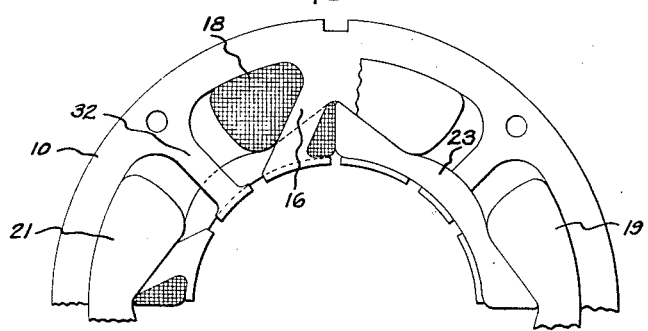
Figure 3:
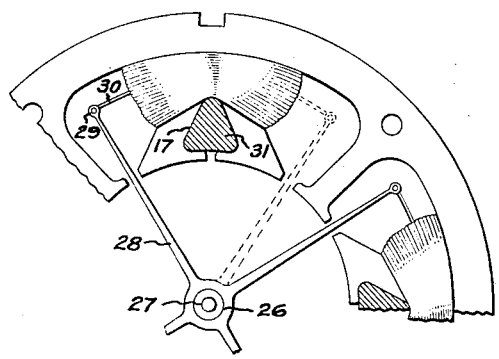
Figure 4:
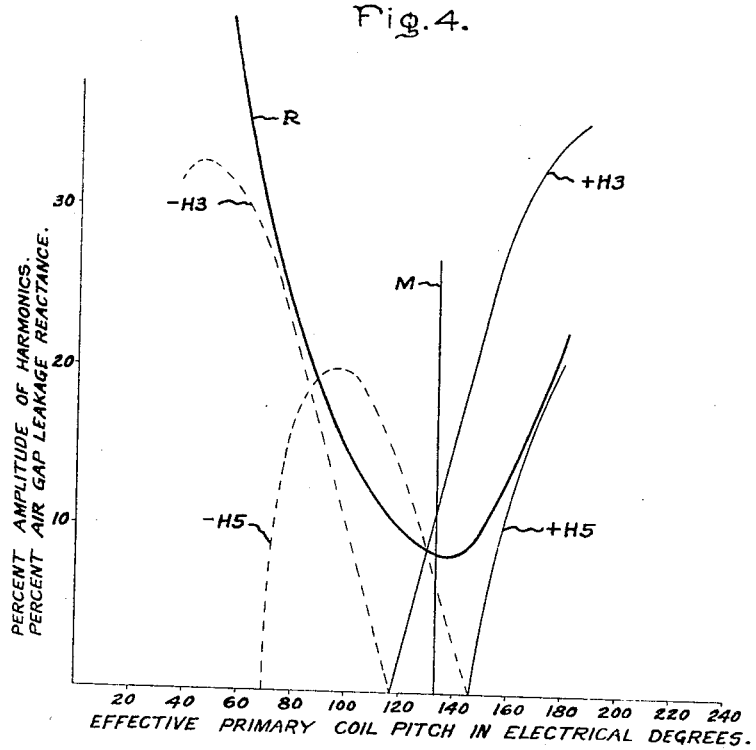
Figure 5:
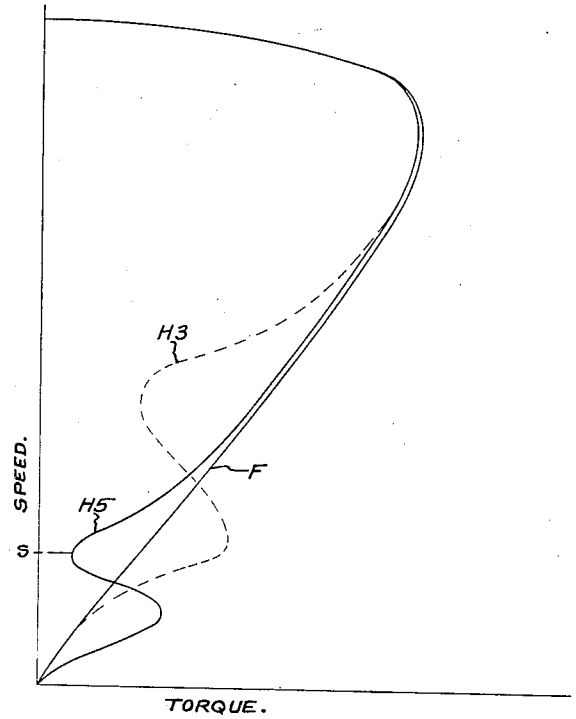
Figure 6:
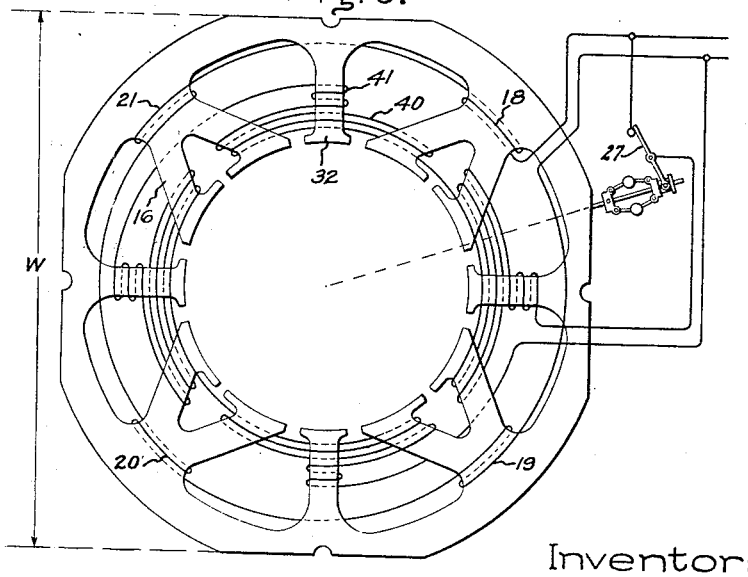

Fig. 2 is a partial view of the same stator shown in Fig. 1 to indicate more clearly the disposition of the completed coils thereon; Fig. 3 shows how this motor structure is adapted for machine winding of the main coils; Fig. 4 shows curves that are helpful in explaining the reason for selecting fractional pitch coils in the motor of our invention; Fig. 5 shows a single-phase speed torque curve indicating the presence and effects of harmonics. Such harmonics are greatly reduced by means of our invention; and Fig. 6 shows a modification of the invention with respect to the starting winding distribution.

Referring now to Fig. 1 we have shown at 10 a desirable form of stator magnetic circuit for a four pole split phase induction motor. The stator framework has not been shown but it will be understood that the magnetic laminations shown will be suitably supported in a framework having end shields with bearings rotatively supporting the shaft 11 of the rotor 12. The openings 13 in the stator are to accommodate holding rivets or bolts and the keyway 14 is to assist in assembling and securing the laminations in proper alignment. 15 indicates a squirrel cage secondary winding on the rotor.

The stator is provided with four inwardly projecting uniformly spaced main polar salients 16. These pole pieces are narrow at their necks where they join with the yoke and widen out at the pole faces to more than twice the width at the neck. A triangular shaped slot 17 is cut in the center of the wider portion of each pole piece 16 with the apex of the triangle extending towards the neck portion, such that the width of the legs which straddle the slot 17 are equal and each approximately or slightly greater than one half the width of the neck portion of the pole piece. The cross-sectional area of the pole piece material is therefore substantially uniform from the yoke to the rotor air gap disregarding the material which is employed at the mouth of the slots 17 to partially close them.

The main coils 18, 19, 20, and 21 of the motor are wound on these main pole pieces 16 and as nearly as possible about the narrow neck portion thereof. The slots 17 each contain the sides of two different coils of the starting winding, the coils of which are numbered from 22 to 25 inclusive. The even numbered coils may be considered positive coils and the odd numbered coils negative coils in both the main and starting windings and are so connected. The main winding is connected to a single-phase source of supply 26 and the starting winding is connected in parallel with the main winding through some form of automatic switch 27 which opens the starting winding circuit as the motor comes up to speed. We have indicated a centrifugal device 28 for opening the starting winding circuit but any other form of automatic device responsive to the speed condition of the motor may be employed.

We may employ phase modifying means in the starting winding circuit external to the motor to obtain the desired phase difference in the currents of the main and starting windings or this phase splitting may be accomplished by the difference in the characteristics of the windings themselves. The design is particularly suited for resistance phase split by the use of a high resistance starting winding because of the comparatively small winding space allotted to the starting winding in the slots 17 and because the starting winding is only used momentarily during starting and appreciable heating thereof is permissible. The starting winding may therefore be wound with small wire as compared to the main winding and have a sufficiently high resistance as compared to the main winding to provide the necessary resistance phase split. It will be noted also that the length of turns in the coils of the main winding are considerably shorter than in the starting winding. This also contributes to a high ratio between the resistances of the starting and running windings and also to a minimum amount of copper and low losses in the main winding during normal operation. In winding the coils of this motor the main coils 18, 19, 20, and 21 are wound first and they may be wound by a standard form of coil winding machine which winds the four coils simultaneously. The tapered shape of the main poles is favorable to this machine winding operation because as the wire is wound the taper at the sides of the pole pieces 16 urges the turns back towards the yoke about the narrow neck portion of the pole pieces, where it is desired that the main coils be placed so far as that is possible consistent with the size of the coil. Thus in Fig. 2 it is seen that the completed main coil 18 is wound back against the yoke and mostly about the narrow portion of the pole piece. The length of a given sized wire in the average length turn is therefore kept as low as possible, contributing to economy in the use of copper and low resistance and losses in the main winding. The tapered shape of the main pole pieces also holds the main coils firmly in place and allows room adjacent to the pole tips for winding on the starting coils 23.

Fig. 3 indicates the machine winding operation. The winding machine for a four coil machine consists of a central hollow arbor 26 which may slide up and down and rotate on a shaft 27. Four needle arms 28 extend radially therefrom. The wires 30 are fed from spools not shown through the eyes 29 of the needles, and the needle assembly is moved by machinery up in the position shown, across the upper end of the stator to the right to the position indicated in dotted lines, then down to the other end of the stator and across the other end to the position shown, thus carrying the wires which are fed through the needles about the pole pieces. The tension of the wire and the slope of the pole pieces tends to draw the wire to the narrow portions of such pole pieces as it is wound. Sticks of woods 31 are preferably inserted through the slots 17 during the machine winding operation of the main coils. These pieces are a little longer than the stator and extend from either end thereof but are short enough so that the arms 28 of the winding machine just clear them when such arms rotate from one side of a main pole piece to the other. The pieces 31 thus serve as an arbor to prevent the main coils from covering the slots 17 as these slots must be kept clear to permit subsequent winding of the starting winding coils therein. It is evident that the slot openings at the extremities of the main pole tips must be of sufficient width to permit the winding needle arms 28 to reciprocate therein. After this winding operation is completed the sticks of wood 31 are driven out and the starting winding wound in slots 17 by hand. After the starting winding is in place the ends of the main coils may be moulded down over the starting winding slightly if that is desired as indicated in Fig. 2 to slightly reduce the overall length of the main coils in an axial direction. We have explained one kind of machine winding operation in a general way to show how the motor design is adapted thereto but the coils do not necessarily have to be wound in this way.

In Fig. 1 "P" indicates the effective pitch of the main poles at the rotor air gap which pitch is obtained by a considerably smaller pitch of the main coils themselves due to the tapered pole pieces. It will be evident that the fluxes produced by the main windings at a given instant may be considered as flowing out of pole pieces embraced by coils 18 and 20, through the rotor to main pole pieces embraced by main coils 19 and 21, and about the stator yoke to the first mentioned main pole pieces. Since we have shown a four pole motor, half of its circumference corresponds to 360 electrical degrees. It is seen then that the effective main winding pole pitch P is of the order of 135 electrical degrees. The advantage of this short main winding pole pitch will presently be explained.

Midway between the main poles we have provided small stator pole pieces 32. These pole pieces are neutral, so far as the flux produced directly by the main windings are concerned although they allow the rotor fluxes to flow and rotate without restriction thus contributing to efficiency. An auxiliary pole piece 32 together with the two adjacent halves of the main pole pieces constitute a starting winding magnetic pole having an effective pitch of equal to substantially 180 electrical degrees. Thus when wound only in slots 17 the starting winding may be considered as wound for full pitch. The flux produced by starting winding coil 22 may be considered as flowing into the rotor through the three polar projections embraced by such coil over a span of 180 electrical degrees and out of the rotor through the three polar projections embraced by starting winding coil 25, then through the yoke of the stator completing the magnetic circuit for such flux. If we wound the starting winding coils around the auxiliary pole pieces 32 only the resulting rotating magnetic field produced by both windings necessary for starting would not be at all satisfactory. We can however with advantage wind properly proportioned coils around pole pieces 32 if in addition the full pitch coils are provided as shown in Fig. 6. If we joined the three parts of the starting winding pole in one to avoid the gaps therein we would divert a large part of the main pole flux from the rotor and at the same time make it impossible to wind the main coils as described above. The auxiliary pole pieces 32, separated from the main pole pieces, permits of a satisfactory distribution of the starting winding flux without diverting appreciable main winding flux from the rotor. The rotor air gap is made considerably smaller than the gap between the tip of the auxiliary poles 32 and the tips of the adjacent main poles.

It will be evident from the foregoing description that we have provided a main pole flux of fractional pitch and a starting pole flux which may be full pitch. The fluxes produced, are not as nearly sinusoidal in distribution as can be produced by a distributed winding in many slots but our concentrated windings produce flux waves which may be generally considered as rectangular instead of sinusoidal. However, because we have used concentrated windings, we have reduced the cost of the motor as compared to one with distributed windings by as much as 20 to 25%.

Now when full pitch concentrated windings are used, resulting in square shaped flux waves, conditions are favorable for the development of detrimental harmonics which produce pronounced dip in the speed torque curve and losses in torque and efficiency at running speed. We have found, however, that the square wave of flux is less subject to the development of detrimental harmonics, if it has a selected pitch less than 180 degrees. The proper pitch to use to avoid the worst conditions is explained in connection with the curves of Fig. 4. In Fig. 4 the abscissa represent the effective primary coil pitch in electrical degrees and the ordinates represent per cent amplitude of harmonics, also per cent air gap leakage reactance. The per cent amplitude of 3rd harmonic that will be developed by a square wave of flux for different pitches is shown by curve H3. The dotted portion of this curve is marked —H3 which indicates that the sign of the equation for the third harmonic is reversed for pitches in the dotted range. Since we are interested only in the absolute magnitude of the third harmonic the curve as drawn is useful.

The full line portion is marked +H3 which indicates that the sign of the third harmonic is positive. The —H5 and +H5 curves indicate the variation of the fifth harmonic torque developed with different coil pitches. The curves for higher harmonics such as the 7th, the 9th, etc. are now shown. They will lie to the right of the curves shown and become smaller as they increase in harmonic value. Line M through about 135 degrees pitch represents the point of minimum resultant negative torque developed by all of the harmonics which need to be considered which means that if we select a coil pitch of 135 degrees we will have minimum disturbance and losses from harmonics. It can be shown that the per cent amplitude of the third harmonic is equal to $$\tfrac{1}{3} \sin 3\frac{(\text{pitch in electrical degrees})}{2}$$

and that the per cent amplitude of fifth harmonic is equal to $$\tfrac{1}{5} \sin 5\frac{(\text{pitch in electrical degrees})}{2}$$

etc. The curves of H3 and H5, Fig. 4, are derived from this formula. Fig. 4 shows another curve R which represents the manner in which the total air gap leakage reactance varies with pitch in electrical degrees of a square wave of primary flux acting through the rotor air gap on a conventional squirrel cage rotor. Another way of explaining this curve is to say that it represents the percentage of flux crossing the air gap which produces no useful result but results in losses. The curve R is derived from the formula that the per cent air gap leakage reactance is equal to $$\frac{\pi^2 x \text{ per cent pitch}}{8 \sin^2 (\text{per cent pitch}) 90°}$$

It is also noted that the low point of curve R falls within a range of 130 to 140 degrees pitch and it follows from these curves if we use a concentrated coil winding we may expect minimum losses and maximum performance if we use a coil pitch of about 135 degrees.

It is seen from Fig. 1 that we use an effective main coil pitch of approximately that value and that therefore although we use a concentrated coil main winding and thus obtain some losses due to the square wave of flux we have designed the motor to obtain an effective main coil pitch where the losses referred to are a minimum.

In Fig. 5 we have shown at F a typical speed torque curve developed by the fundamental wave of flux of a single-phase coil. If the coil is full pitch and produces a square wave flux it will develop in the motor additional harmonic torques, the fifth and third of which are indicted by solid and dotted lines marked H5 and H3. These harmonic torques vary between plus and minus values at different speeds, those portions which are shown to the left of curve F being negative. It is seen that at speed S the fifth harmonic will produce a pronounced dip in the speed torque curve that correspondingly reduces the load which the motor can bring up to speed. At nearly half speed the third harmonic produces another pronounced dip in torque. At running speed the harmonic torques taken individually are not great but they are all negative and added together result in an appreciable loss in torque and lowering of efficiency. By employing the fractional pitch coils for the main winding we are able to reduce the harmonic losses that would exist with a full pitch concentrated coil to a negligible value. The third harmonic losses are reduced to ⅑ the full value and the 5th harmonic losses to 1/25 the full value by using a 135° pitch.

The starting winding as stated previously may be full pitch in which case we do not represent that we have reduced the harmonic losses incident thereto. However, the starting and accelerating torque produced by this winding in combination with the main winding is very good and has no serious low torque points. At running speed after the starting winding is cut out the harmonic losses are reduced to the lowest value possible consistent with the use of a concentrated running winding.

In the arrangement of Fig. 6, we may also reduce the harmonic losses incident to the starting winding. In this figure, the arrangement is similar to that of Fig. 1 except as to the external shape of the stator laminations and the distribution of the starting winding.

The external contour of the lamination is made more nearly square in shape instead of being circular as in Fig. 1. The only advantage claimed for this is less waste of material when the laminations are punched out of sheet strips having a width W, Fig. 6.

In Fig. 6, the starting winding per pole is made up of two coil sections. One coil section 40 has the same pitch and distribution as the starting winding coil in Fig. 1 and another coil section 41 is wound about the auxiliary pole pieces or teeth 32. This arrangement gives a larger thermal capacity to the starting winding as compared to Fig. 1 and is beneficial from the point of view of there being less danger of a burn-out in the starting winding during heavy starting duty. The reactance of the winding is also less than in Fig. 1 and there is improvement in the startng torque. This starting winding per pole may be considered to be made up of two concentrated coils of different pitch having the same center and, to this extent, it approaches a distributing winding with correspondingly better flux distribution and decreased losses due to harmonics.

Those portions 41 of the starting winding which are wound about the auxiliary pole 32 may be wound on by machinery prior to the winding on of the portions 40. The winding cost is more favorable than that of the conventional distributing winding.

We have thus produced a relatively inexpensive motor with performance characteristics that have to our knowledge never been obtained in motors of the split phase type except by employing a more expensive construction, embodying distributed windings.

The motor of our invention is also exceptionally quiet in operation which we believe is due to the use of a main coil pitch that reduces the harmonic disturbances and air gap leakage reactance losses to a minimum.

The invention has been described taking a four pole motor as an example. Our invention, however, is not limited to four pole motors. While we have explained what we now consider to be the most desirable pitch selection for concentrated coil windings, other considerations may sometimes make a compromise necessary or desirable and we do not wish to limit our invention to the particular arrangement described in detail but seek claims commensurate with the true spirit and scope of our invention.

What we claim is new and desire to secure by Letters Patent of the United States:

1. A split phase motor having a laminated magnetic stator provided with inwardly projecting main pole pieces, said pole pieces tapering from a narrow neck portion to a wide pole face portion, concentrated main winding coils about the narrow neck portions, a slot in the center of the pole face portion, and a starting winding having coils with sides in said slots, each such starting winding coil embracing adjacent halves of their adjacent main pole pieces, said main winding coils having an effective pitch of approximately 135 electrical degrees.

2. A split phase motor having a laminated stator member provided with inwardly projecting main pole pieces, said pole pieces tapering from a narrow neck portion to a pole face portion which is approximately two times as wide as the neck portion, triangular slots in the center of the wide pole face portions with the apex of such triangular slot towards the neck portions of the pole pieces so as to leave the pole pieces of substantially uniform cross section from neck to pole face, concentrated main winding coils on the narrow neck portions of said pole pieces, and a starting winding having coils with their sides in the triangular slots and each embracing adjacent halves of two adjacent main pole pieces, said main pole pieces having a pole face pitch lying between 130 and 140 electrical degrees.

3. A stator for a split phase motor comprising, a laminated magnetic structure with a plurality of inwardly projecting main pole pieces, said pole pieces tapering from a narrow neck portion to a pole face portion approximately two times as wide as the neck portion, a triangularly-shaped partially-closed slot in the center of the pole face portions of each pole piece with the apex of the triangle towards the neck portion of the pole piece, leaving the cross section of the pole piece substantially uniform from neck to pole face, the pole face pitch of said pole pieces being not less than 120 and not more than 150 electrical degrees, auxiliary pole pieces midway between the main pole pieces, concentrated main winding coils about the neck portions of said main pole pieces, and a starting winding having coils wound about the auxiliary pole pieces and embracing the adjacent halves of the main pole pieces by having coil sides in said triangular slots.

4. A stator for a split phase motor comprising, a laminated magnetic structure having inwardly projecting main and auxiliary pole pieces alternately arranged, the main pole pieces each tapering from a narrow neck portion to a pole face width approximately two times as wide as the neck and having the wide pole face portion split by a triangular partially closed slot tapering towards the neck of the pole piece so as to leave the cross-sectional area of the pole piece substantially uniform from neck to pole face, concentrated main winding coils on the narrow neck portions of the main pole pieces, and a starting winding made up of two coil sections per motor pole, one such coil section being wound about an auxiliary pole piece only and the other such coil section being wound about the auxiliary pole piece as a center and embracing adjacent halves of the main pole pieces by having its coil sides in the triangular slots thereof, the effective pole pitch of the main winding coils being between 120 and 150 electrical degrees.

5. A resistance split phase motor having a laminated magnetic stator with inwardly projecting main and auxiliary salient pole pieces, the main pole pieces being about two times as wide at the pole face as at the throat portion and having a slot in the center of the wide pole face portion which reduces the cross-sectional area thereat to approximately the cross-sectional area at the throat portion, concentrated main winding coils about the necks of said main pole pieces, and a starting winding having coils wound about the auxiliary pole pieces and embracing adjacent halves of the main pole pieces by having coil sides in the slots thereof, the effective pole pitch of the main winding being between 120 and 150 electrical degrees, the starting winding having a sufficiently high resistance as compared to the resistance of the main winding to accomplish resistance split-phase starting without other phase-splitting provisions.

WAYNE J. MORRILL.
KENNETH A. KILLAM.